Sept. 1, 1964 W. J. WALDEN, SR 3,147,033
VEHICLE FOR TRANSPORTING AND CURING TOBACCO
Filed Nov. 8, 1961 2 Sheets-Sheet 1
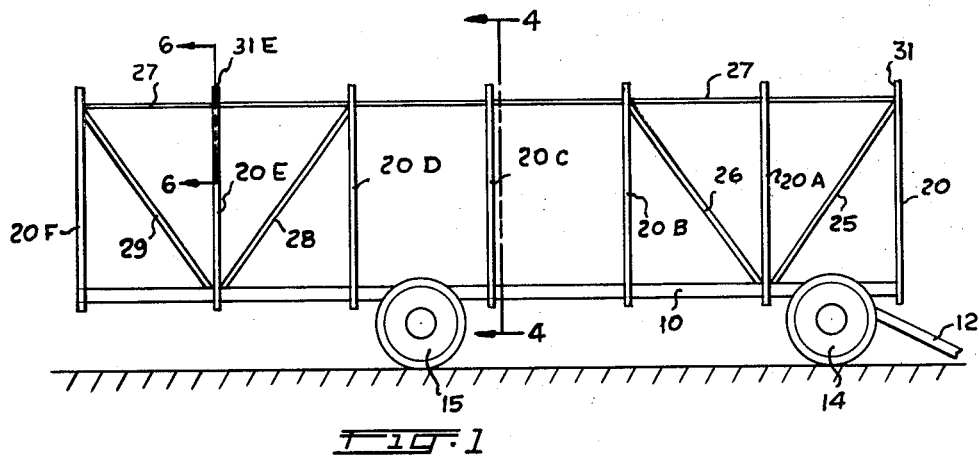
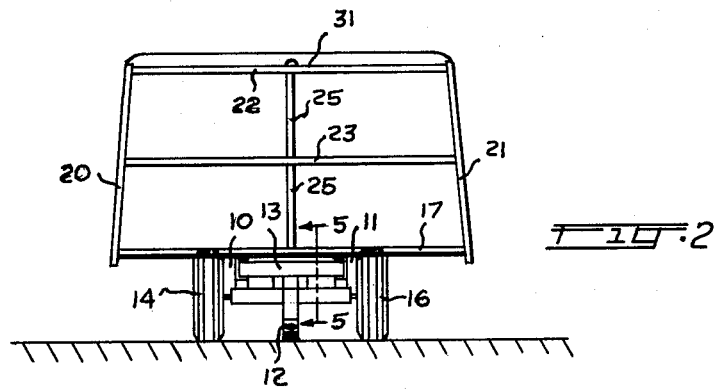
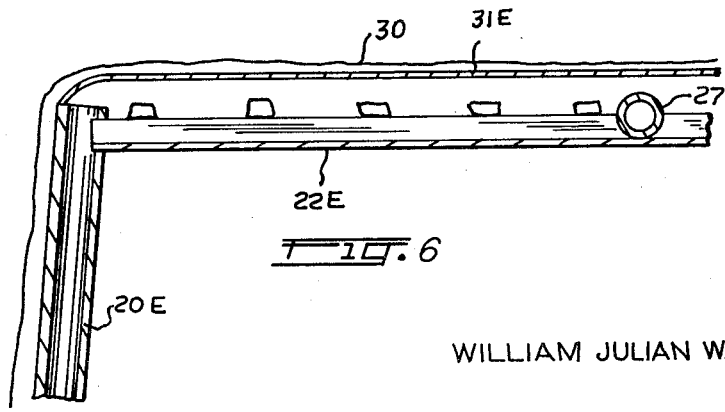
INVENTOR
WILLIAM JULIAN WALDEN, SR.
BY W. E. Sherwood
ATTORNEY

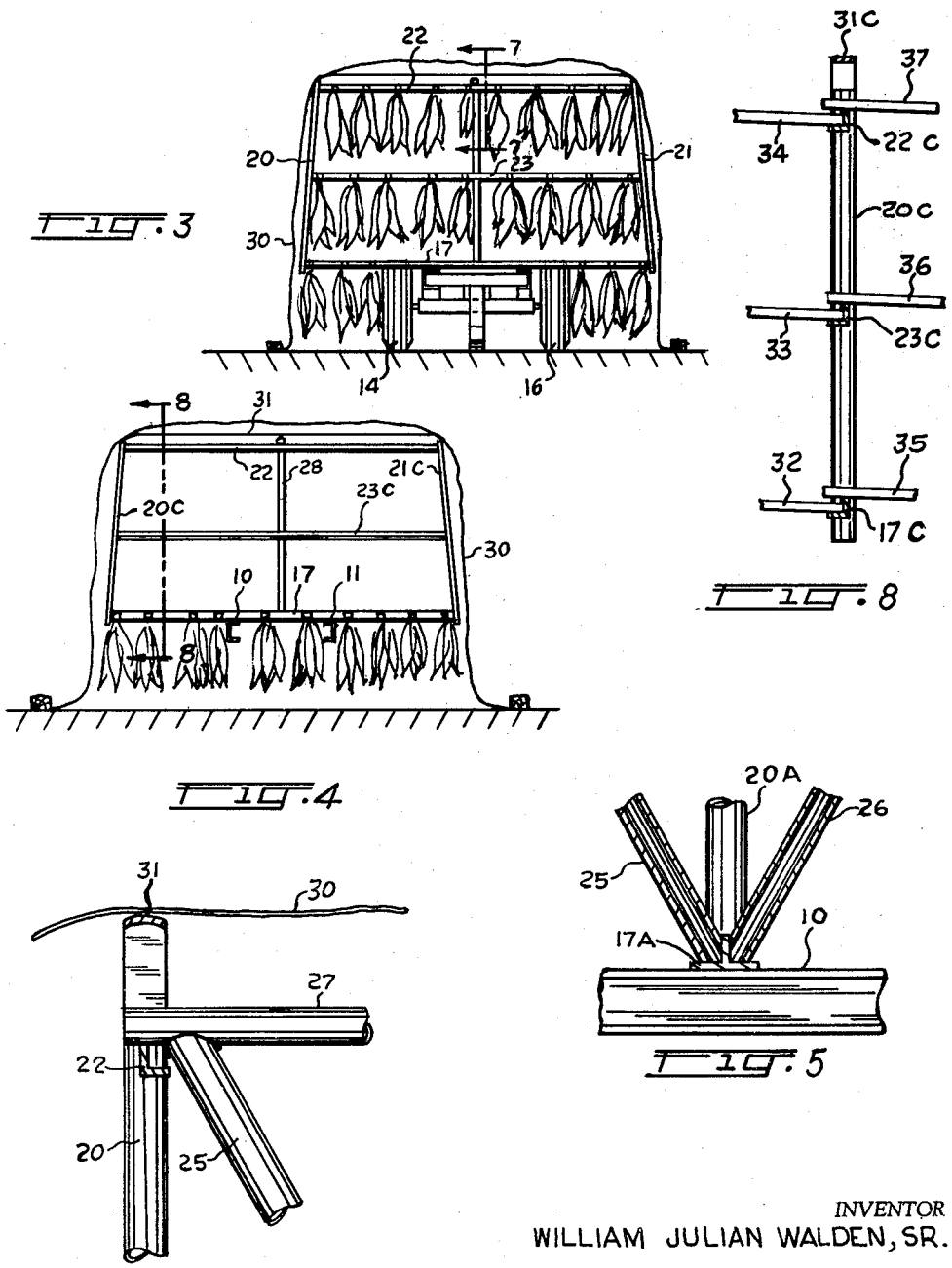

United States Patent Office 3,147,033
Patented Sept. 1, 1964

3,147,033
VEHICLE FOR TRANSPORTING AND CURING TOBACCO
William Julian Walden, Sr., Midway, Ky.
Filed Nov. 8, 1961, Ser. No. 152,129
8 Claims. (Cl. 296—5)

This invention relates to vehicles for use in the harvesting and curing of tobacco and more particularly to a side-loaded vehicle which may be loaded with tobacco on sticks by a single worker in the field, moved in loaded condition with the tobacco sticks resting in a locked arrangement on the vehicle to the curing site and then employed in the curing process without requiring rehandling of the tobacco prior to the completion of that curing process.

An object of the invention is to provide a vehicle on which sticks supporting tobacco thereon may be loaded with the axis of all sticks extending generally parallel to the longitudinal axis of the vehicle, and with at least one end of each stick being locked against shifting in the direction of movement of the vehicle.

Another object is to provide a vehicle which when fully loaded with tobacco on sticks, will present a generally uniform resistance, as measured transversely of the vehicle and extending upwardly from the ground, to the passage of air moving lengthwise of the vehicle through the spaces between the several sticks of tobacco.

A further object is to provide a vehicle having a framework thereon for transporting and curing tobacco on sticks arranged in a series of multi-tier longitudinally extending curing compartments.

A further object is to provide a vehicle having a framework thereon for transporting and curing tobacco on sticks and with the framework including exterior surfaces across which a flexible envelope may be extended without snagging.

A still further object is to provide a large-capacity vehicle having a braced framework thereon for transporting and curing tobacco on sticks arranged longitudinally of the vehicle and with the bracing being disposed in a vertical plane.

Other objects and advantages of the invention will become more apparent as the description proceeds and when considered in conjunction with the accompanying drawings in which:

FIG. 1 is a side elevation view of an unloaded vehicle.

FIG. 2 is a front end elevation of the vehicle of FIG. 1.

FIG. 3 is a view similar to FIG. 2 and showing the forward tiers of curing compartments in loaded condition preparatory to curing.

FIG. 4 is a view along line 4—4 of FIG. 1, and showing the lower tier of a central compartment in loaded condition preparatory to curing.

FIG. 5 is a detail view to a larger scale taken on line 5—5 of FIG. 2 and showing one form of lower bracing for that framework.

FIG. 6 is a detail view to a larger scale taken on line 6—6 of FIG. 1 and showing one form of a means for defining a ridge line.

FIG. 7 is a detail view to a larger scale taken on line 7—7 of FIG. 3 at the rear of the vehicle and showing one form of upper bracing for the framework, and FIG. 8 is a side elevation view of one of the side stanchions showing the locking of one end of the tobacco sticks upon the transverse members.

In accordance with the invention, I provide a wheeled vehicle having a chassis on which a framework, either of a fixed or removable nature, is mounted. The framework defines a series of multi-tier curing compartments extending longitudinally of the vehicle, and within which tobacco on sticks may be disposed with those sticks extending axially of the vehicle. A suitable roof element is positioned above the framework of the uppermost tier so as to serve a ridge-defining purpose for an envelope during the curing usage of the vehicle. The framework of the vehicle, moreover, overhangs the wheels in all directions so that the vehicle may be abutted in tandem with similar vehicles, and so that the tobacco on the sticks in the lowermost tier may extend transversely of the entire vehicle and close to the surface on which the wheels rest.

Referring now to FIGS. 1 and 2, one form of vehicle embodying the invention may comprise a chassis having longitudinal beams 10 and 11 mounting at their forward ends a towing bar 12 extending from the usual fifth wheel assembly 13. A plurality of ground-engaging wheels, here indicated as four and with wheels 14, 15 and 16 being shown, are carried by the chassis, and the front and rear ends of the beams project beyond the respective front and rear wheels.

Securely attached to the longitudinal beams in any suitable manner, and here indicated for convenience as being welded thereto, is a plurality of transversely extending horizontal members hereafter defined as lower members of the framework. These members are uniformly spaced from each other with the forwardmost and rearwardmost members being disposed at the extreme ends of the beams, the forwardmost such member being shown at 17 and certain intermediate members being shown at 17A and 17C. These lower members extend laterally beyond the planes of the wheels and have an appreciable length, for example, ten feet. These members may have any suitable cross section and be formed of any suitable material consistent with the loading which they carry and the locking of the end or ends of the tobacco sticks thereby. For example, either a member in the form of an inverted T, as seen at 17A, or a member in the form of an L with the inner backwall facing toward the front of the vehicle, as seen at 17C, may be employed. As will further be understood, the elevation of these lower members above the ground surface is such as to provide an appreciable depth of space for the tobacco loaded on the sticks and occupying the lowermost tier of the framework.

The extreme ends of these lower members are mortised into the wall of side stanchions arranged in vertical planes and are welded or otherwise fixed rigidly thereto. The side stanchions preferably are of tubular material and are arranged in pairs at the respective sides of the vehicle, one such pair, for example, at the forwardmost end of the vehicle being seen at 20, 21. The external surfaces of such stanchions are smooth. Adjacent the upper end of the stanchions a horizontal upper transverse member or rail such, for example, as the rail 22E extending between the pair of stanchions next adjacent the rearmost pair of stanchions and which preferably is of L shape with the inner backwall facing toward the front of the vehicle, is mortised into the stanchion as best seen in FIG. 6. The upper members preferably have a length less than that of their corresponding lower members, so as to provide a truncated end elevation for the framework, as shown for example in FIG. 2. Such a truncated end elevation is well suited both for stabilization of the vehicle and for providing a desirable shaping of the envelope during a curing process.

Since a large-capacity vehicle is preferred during employment of the same in tobacco curing, I use a three-tier vehicle and accordingly an intermediate horizontally disposed member 23 having a length less than that of the lower members of the framework, but greater than that of the upper members thereof, is mortised at its ends into the respective side stanchions and with the depth of the spaces between the member 23 and the corresponding upper and lower members 22 and 17 preferably but not necessarily being the same as the depth of the space between that lower member and the ground. By the same token, as many curing compartments as possible, consistent with stability and strength of the vehicle, are employed, six such compartments as shown in FIG. 1 and defined by stanchions 20, 20A, 20B, 20C, 20D, 20E and 20F, having been found to be practicable. When employing a large number of such curing compartments, the invention comprehends the bracing of the framework and such bracing should be so arranged as to avoid any diminution of the space available for supporting the tobacco.

Referring now to FIGS. 5 and 7, the bracing may comprise at the forward end of the vehicle a pair of diagonally disposed tubular rods 25 and 26 located in the vertical center-line plane of the vehicle and with the upper ends of such rods securely affixed to a longitudinal tubular rod 27 which in turn has each of the upper members 22 mortised thereinto adjacent the center line of that vehicle. At their lower ends the bracing rods may be affixed (as seen in FIG. 5), to the upper surface of the lower member 17A which is immediately inboard of the member 17. A similar bracing arrangement comprising diagonally disposed rods 28 and 29 serves to reinforce the rearmost compartments of the framework overhanging the rear wheels of the vehicle.

The vehicle as described thus far may be solely employed for the general transporting of tobacco on sticks from the field, but I prefer to employ the same for use in the tobacco curing process more fully disclosed in my co-pending application Serial No. 152,130, filed November 8, 1961, now Patent No. 3,088,178.

For this purpose, there is provided a suitable means for supporting a flexible envelope 30 in surrounding relation to the loaded vehicle.

Such means may include a series of roof-like elements serving to define an elevated ridge line longitudinally of the vehicle in conjunction with the envelope. These roof-like elements may include an arched member 31 joined at its respective ends to the upper ends of the side stanchions of each compartment above the junctions of these side stanchions with the upper members of the framework. The arched member has a smooth outer surface for contact with the envelope. Preferably, it is arched transversely of itself, as seen in FIG. 7. As will be understood, the corresponding structural parts associated with the several compartments of the illustrated vehicle are designated with suffixes A to F corresponding with the second to sixth compartments from the front of the vehicle. Accordingly, as indicated by FIG. 6 the arched member 31E cooperates not only with the arched member 31 (FIG. 1) at the front of the vehicle and with the intermediate arched member 31C (FIG. 8), but also with the remaining arched members to afford a support for envelope 30.

Referring now to FIG. 8 an important feature of the invention will be noted and wherein the tobacco sticks are locked or restrained against endwise shifting. This restraint may be in the form of a double-locking in which each end of a stick abuts against a confining surface, or in the form of a single locking, as shown in FIG. 8, in which the rear end of the stick only is abutted against such surface. In the arrangement shown, the ends of sticks 32, 33 and 34 in the tiers of a forward compartment rest upon the flat horizontal inner surface of the respective L-shaped members 17C, 23C and 22C and the inertia of the load when the vehicle moves forwardly holds the ends of the sticks locked against the vertical inner face of those members. Similarly, if the inverted T members are used, the sticks are likewise locked. In many cases, however, the lengths of all sticks are not uniform and when longer sticks are employed, as seen at 35, 36 and 37, in the next rearward compartment, the forward ends of the same may rest upon the top edge of the vertical portion of the member. This slight tilting of the stick of tobacco, moreover, does not introduce any difficulty in the subsequent curing usage of the vehicle.

Having thus described the structural portions of one form of vehicle embodying the invention, the advantages of the same in carrying out its intended purposes will now become apparent to those skilled in the art. With an empty vehicle in the tobacco field, a single worker is enabled to load the same from the sides of the vehicle and may employ a small portable platform resting on the ground for use as a step, not shown, in loading the uppermost rails of the vehicle. Each stick loaded with tobacco extends longitudinally of the vehicle with spaces between adjacent sticks and through which drying air may later be directed as taught by the aforementioned copending application. Since the tobacco loaded upon the vehicle will normally be cured under controlled drying conditions, rather than under ambient air conditions dependent upon the weather, the sticks of tobacco may be disposed relatively close together, thus mutually supporting themselves against endwise as well as sidewise motion. This mutual support of the adjacent tobacco, together with the above described locking of the sticks upon the framework assists in maintaining the vehicle in properly loaded condition as it moves to the curing site.

When loading the vehicle in the field, the two uppermost tiers will usually be loaded for transport to the curing site, and if the length of the tobacco on the sticks is such that it will not touch the ground, the lowermost tier may also be loaded in the field. In any event, when the vehicle is present at the curing site the lowermost tier will be loaded prior to carrying out the afore-mentioned curing process. As seen in FIG. 3, the portion of the lower tier in which the front wheels of the vehicle are located, will be loaded with tobacco outboard of those wheels, but for compartments in which no wheels are located the entire lower tier is fully loaded transversely of the vehicle as seen in FIG. 4. The bracing of the framework permits sticks of tobacco to be placed close to the plane of such bracing.

It will be understood that the actual number of sticks on each rail member will be appreciably more than the number herein shown for illustration. Furthermore, the junction of the lower member 17 with the stanchions; the junction of the intermediate member 23 with the stanchions; and the junction of the upper member 22 with the stanchions all provide corners in which the sticks adjacent thereto are lodged against sidewise movement. As will be noted, the ends of such sticks all lie inboard of the area over which the envelope will later be moved and thus will not interfere with such movement.

Having thus described the invention and having shown one embodiment thereof, I do not desire the invention to be limited to the particular construction disclosed, but rather I intend by the appended claims to cover all modifications within the true spirit and scope of the invention.

What I claim as new and desire to secure by Letters Patent of the United States is:

1. A wheeled vehicle for use in transporting and curing tobacco and comprising, a chassis having longitudinal beams mounting ground-engaging wheels and overhanging said wheels at the ends of said chassis, a plurality of lower horizontal members, the respective ends of said lower members overhanging the planes in which said wheels are located, said lower members being supported transversely of said beams and uniformly spaced from each other, thereby to provide a lower tier of curing compartments near the ground, a plurality of corresponding upper members disposed horizontally above said lower members thereby to provide an upper tier of curing compartments, said upper and said lower members at the rear of each compartment having an upstanding wall portion against which the rear ends of sticks supporting said tobacco and resting on said members may abut, each of said tiers of curing compartments presenting, when filled with tobacco upon said sticks, arranged longitudinally of said vehicle, a generally uniform resistance to the passage of air moving lengthwise of the vehicle, and stanchions at the respective sides of said vehicle connecting the respective ends of the upper and lower members of said compartments and mounting said uper members in spaced relation to each other and to said lower members, said stanchions having smooth outer surfaces.

2. A vehicle as defined in claim 1 wherein, the foremost and rearmost stanchions are located at the extreme ends of said beams, thereby to permit either end of said vehicle to be placed in closely abutting tandem relation to an end of a similar vehicle.

3. A vehicle as defined in claim 1 including, an elongated reinforcing member extending longitudinally of said vehicle and attached to each of said upper members adjacent the mid-portions of the same, thereby to assist in spacing said upper members from each other and to brace the same against stresses caused by the loaded tobacco sticks and by movement of said vehicle.

4. A wheeled vehicle for use in transporting and curing tobacco and comprising, a chassis having longitudinal beams mounting ground-engaging wheels and overhanging said wheels at the ends of said beams, a plurality of lower horizontal members for receiving the ends of loaded tobacco sticks, the respective ends of said lower members overhanging the planes in which said wheels are located, said lower members being supported transversely of said beams and uniformly spaced from each other thereby to provide a lower tier of curing compartments near the ground, a plurality of corresponding upper members disposed horizontally above said lower members for receiving the ends of loaded tobacco sticks thereby to provide an upper tier of curing compartments, each of said tiers of curing compartments presenting, when filled with tobacco upon said sticks arranged longitudinally of said vehicle, a generally uniform resistance to the passage of air moving lengthwise of the vehicle, stanchions at the respective sides of said vehicle connecting the respective ends of the upper and lower members of said compartments and mounting said upper members in spaced relation to each other and to said lower members, and a roof element supported by said stanchions above said upper members for establishing an elevated ridge line for said vehicle upon envelopment of the top and sides of the vehicle by a flexible envelope, said roof element and said stanchions having smooth outer surfaces.

5. A wheeled vehicle for use in transporting and curing tobacco and comprising, a chassis having longitudinal beams mounting ground-engaging wheels and overhanging said wheels at the ends of said chassis, a plurality of lower horizontal members for receiving the ends of loaded tobacco sticks, the respective ends of said lower members overhanging the planes in which said wheels are located, said lower members being supported transversely of said beams and uniformly spaced from each other thereby to provide a lower tier of curing compartments near the ground, a plurality of corresponding intermediate horizontal members disposed above said lower members for receiving the ends of loaded tobacco sticks thereby to provide an intermediate tier of curing compartments, a plurality of corresponding horizontal upper members for receiving the ends of loaded tobacco sticks thereby to provide an upper tier of curing compartments, each of said tiers of curing compartments presenting, when filled with tobacco upon said sticks arranged longitudinally of said vehicle, a generally uniform resistance to the passage of air moving lengthwise of the vehicle, stanchions at the respective sides of said vehicle connecting the respective ends of the lower, intermediate, and upper members of said compartments and mounting the intermediate and upper members in spaced relation to each other and to said lower members thereby to form a side-loading vehicular framework which may be loaded in the field, moved in loaded condition to a curing site, and employed in a curing process without rehandling of said tobacco prior to completion of said process, and a roof element supported by said stanchions above said upper members for establishing an elevated ridge line for said framework upon envelopment of the top and sides of the vehicle with a flexible envelope, said roof element and said stanchions having smooth outer surfaces.

6. A vehicle as defined in claim 5 wherein said intermediate members have a length less than said lower members and greater than said upper members, 7. A vehicle as defined in claim 5 wherein the vertical spacing between said upper and intermediate members and between said intermediate and lower members is substantially equal to the vertical spacing between said lower members and the ground.

8. A vehicle as defined in claim 5 including, a bracing means disposed in a vertical plane adjacent the center line of said vehicle and connecting the endmost of said upper members to lower members disposed inboard of the ends of said chassis.

References Cited in the file of this patent

UNITED STATES PATENTS

| | | |
|---|---|---|
| 298,252 | Sternberg | May 6, 1884 |
| 1,879,513 | Rothholz | Sept. 27, 1932 |
| 2,797,822 | Shaver | July 2, 1957 |
| 2,980,438 | Baer | Apr. 18, 1961 |